United States Patent
Lorenzoni et al.

(10) Patent No.: US 9,964,437 B2
(45) Date of Patent: May 8, 2018

(54) LASER SCANNER WITH REDUCED INTERNAL OPTICAL REFLECTION COMPRISING A LIGHT DETECTOR DISPOSED BETWEEN AN INTERFERENCE FILTER AND A COLLECTING MIRROR

(71) Applicant: DATALOGIC IP TECH, S.R.L., Bologna (IT)

(72) Inventors: Enrico Lorenzoni, Bologna (IT); Giacomo Rigoni, Bologna (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 114 days.

(21) Appl. No.: 15/145,545

(22) Filed: May 3, 2016

(65) Prior Publication Data

US 2017/0322075 A1    Nov. 9, 2017

(51) Int. Cl.
| | |
|---|---|
| *F16P 3/12* | (2006.01) |
| *G01J 1/04* | (2006.01) |
| *G01J 1/44* | (2006.01) |
| *G01S 7/481* | (2006.01) |

(52) U.S. Cl.
CPC ........... *G01J 1/0414* (2013.01); *G01J 1/0488* (2013.01); *G01J 1/44* (2013.01); *G01S 7/4817* (2013.01)

(58) Field of Classification Search
CPC .... G01J 1/0488; G01S 7/4817; G01S 17/026; F16P 3/12; F16P 3/144
USPC ............... 250/236, 221, 559.12, 216
See application file for complete search history.

(56) References Cited

U.S. PATENT DOCUMENTS

| | | | |
|---|---|---|---|
| 4,687,282 A | 8/1987 | Ferrante | |
| 5,202,784 A | 4/1993 | Reddersen | |
| 5,337,189 A | 8/1994 | Krawczyk et al. | |
| 5,455,669 A | 10/1995 | Wetteborn | |

(Continued)

FOREIGN PATENT DOCUMENTS

| | | |
|---|---|---|
| CN | 101916357 A | 12/2010 |
| CN | 106324582 A | 1/2017 |

(Continued)

OTHER PUBLICATIONS

Corrain et al., "Laser Scanner and Optical System," U.S. Appl. No. 15/145,532, filed May 3, 2016, 47 pages.

(Continued)

*Primary Examiner* — Que T Le
(74) *Attorney, Agent, or Firm* — Seed IP Law Group LLP

(57) ABSTRACT

A laser scanner which includes a light source which emits a light beam and a scanning mirror rotatable about an axis which reflects the light beam through a tilted protective window toward a scanning area and which directs return light from objects toward receiving optics. The laser scanner may include a collecting mirror which receives the return light, and an interference filter disposed between the collecting mirror and the scanning mirror. The window may include an anti-reflective coating which reduces reflection of internally scattered light. The tilted window may direct the reflective component of internally scattered light into a zone where an energy light absorber is present. A bulkhead system which may include a separation baffle may be provided to prevent light incident on the interference filter at an angle which is below an acceptance angle of the interference filter.

24 Claims, 7 Drawing Sheets

(56) References Cited

U.S. PATENT DOCUMENTS

| | | | |
|---|---|---|---|
| 6,491,222 B1 | 12/2002 | Dvorkis et al. | |
| 7,280,211 B2 | 10/2007 | Horibe et al. | |
| 7,880,865 B2 * | 2/2011 | Tanaka | G01S 7/4813 356/4.01 |
| 7,965,384 B2 | 6/2011 | Drinkard | |
| 8,319,171 B2 | 11/2012 | Kawabata | |
| 8,330,095 B2 | 12/2012 | Kawabata | |
| 8,625,080 B2 | 1/2014 | Heizmann et al. | |
| 8,724,096 B2 | 5/2014 | Gosch et al. | |
| 8,902,409 B2 | 12/2014 | Sigmund et al. | |
| 2002/0143506 A1 | 10/2002 | D'Aligny et al. | |
| 2005/0205755 A1 | 9/2005 | Walsh et al. | |
| 2008/0316310 A1 | 12/2008 | Braune et al. | |
| 2009/0002678 A1 | 1/2009 | Tanaka et al. | |
| 2009/0086189 A1 | 4/2009 | Drinkard | |
| 2010/0198365 A1 | 8/2010 | Kawabata et al. | |
| 2011/0077814 A1 | 3/2011 | Haberer | |
| 2012/0026466 A1 | 2/2012 | Zhou et al. | |
| 2013/0003041 A1 | 1/2013 | Sigmund et al. | |
| 2013/0250302 A1 | 9/2013 | Kramer | |
| 2013/0256418 A1 | 10/2013 | Havens et al. | |
| 2014/0166866 A1 | 6/2014 | Gehring et al. | |

FOREIGN PATENT DOCUMENTS

| | | |
|---|---|---|
| DE | 103 26 848 A1 | 1/2005 |
| DE | 20 2009 015 194 U1 | 3/2010 |
| DE | 10 2012 102 244 A1 | 10/2012 |
| DE | 10 2012 112 987 B3 | 12/2013 |
| DE | 20 2013 101 807 U1 | 7/2014 |
| EP | 1 562 055 A2 | 8/2005 |
| EP | 1 617 205 A1 | 1/2006 |
| EP | 1 617 206 A1 | 1/2006 |
| EP | 1 666 913 A2 | 6/2006 |
| EP | 1 965 225 A2 | 9/2008 |
| EP | 2 237 063 A1 | 10/2010 |
| EP | 2 375 264 B1 | 5/2012 |
| EP | 2 447 733 A1 | 5/2012 |
| EP | 2 378 309 B1 | 7/2012 |
| EP | 2 541 273 B1 | 5/2013 |
| EP | 2 624 016 A1 | 8/2013 |
| EP | 2 950 115 A1 | 12/2015 |
| EP | 3 267 218 A1 | 1/2018 |
| JP | 62-254008 A | 11/1987 |
| WO | 97/22945 A1 | 6/1997 |
| WO | 03/087875 A1 | 10/2003 |

OTHER PUBLICATIONS

Elmer, "The Optical Design of Reflectors." New York, NY, John Wiley & Sons, 1980, pp. 72-75.

Faetani et al., "Clutter Filter Configuration for Safety Laser Scanner," U.S. Appl. No. 15/203,531, filed Jul. 6, 2016, 38 pages.

Lorenzoni et al., "Laser Scanner With Reduced Internal Optical Reflection," U.S. Appl. No. 15/145,545, filed May 3, 2016, 30 pages.

Omron Corporation, "Safety Laser Scanner OS32C Series—User's Manual," Manual No. Z296-E1-10, Mar. 2015, 179 pages.

Rigoni, "Laser scanner and related receiving optical system," Datalogic Invention Disclosure Form, Jan. 14, 2016, 15 pages.

SICK Sensor Intelligence, "microScan3—The New Generation of Safety Laser Scanners," Feb. 29, 2016, 28 pages.

SICK Sensor Intelligence, "Safety Designer—Configuration software—Installation and operation," Feb. 5, 2016, 32 pages.

Zhao, "Practical Reflector Design and Calculation for General Illumination," *Proceedings of SPIE 5942, Nonimaging Optics and Efficient Illumination Systems II*, San Diego, CA, Jul. 31, 2005, 9 pages.

Extended European Search Report, dated Aug. 25, 2017, for European Application No. 17169258.5-1812, 72 pages.

Office Action, dated Jul. 28, 2017, for U.S. Appl. No. 15/203,531, Faetani et al., "Clutter Filter Configuration for Safety Laser Scanner," 12 pages.

Office Action, dated Sep. 22, 2017, for U.S. Appl. No. 15/145,532, Corrain et al., "Laser Scanner and Optical System," 10 pages.

Extended European Search Report, dated Oct. 23, 2017, for European Application No. 17169257.7-1812, 6 pages.

International Search Report, dated Oct. 12, 2017, for International Application No. PCT/IT2017/000094, 12 pages.

Extended European Search Report, dated Nov. 30, 2017, for European Application No. 17179849.9-1812, 8 pages.

* cited by examiner

LASER SCANNER WITH REDUCED INTERNAL OPTICAL REFLECTION COMPRISING A LIGHT DETECTOR DISPOSED BETWEEN AN INTERFERENCE FILTER AND A COLLECTING MIRROR

BACKGROUND

Technical Field

The present disclosure generally relates to optical sensors, and more particularly, to laser scanners and optical systems for laser scanners.

Description of the Related Art

Optical sensors are currently used in a number of applications for the detection of objects. One type of optical sensor is a laser scanner, in which a collimated light beam generated by a laser source periodically moves over an area to be scanned or monitored. The light beam may be moved by a scanning mirror or other deflection unit which rotates or oscillates to direct light beams over the area. Using the angular position of the scanning mirror, the angular position of an object may be determined. Using the time of flight for pulses of light reflected by an object and the speed of light, the distance of an object may also be determined. From the angular and distance measurements, objects may be detected in the area in two-dimensional polar coordinates, for example.

In addition to object measurement applications, laser scanners may also be used in safety applications for monitoring a source of danger, such as a machine. In such safety applications, a laser scanner may be positioned to monitor an area proximate the source of danger which should not be entered by personnel. If a person or object enters the monitored area when the laser scanner is active, the laser scanner may generate an alarm and/or mitigate the source of danger (e.g., cause shutdown of a running machine).

FIG. 1 shows a schematic sectional view of a laser scanner 10 described in U.S. Pat. Pub. No. 2013/0003041. In operation, a light source 12, such as a laser diode, emits a collimated beam 14 in the form of short (e.g., few nanoseconds) pulses toward a bending or folding mirror 16, which reflects the beam toward a scanning mirror 18, which directs the beam toward a scanning area 20. If an object is present in the scanning area 20, the diffuse light 22 that is back-reflected by the object is reflected by the scanning mirror 18, collected by a collecting lens 24 and detected by a light detector 26 (e.g., a photodiode).

A motor 28 may be operatively coupled to the scanning mirror 18 to drive the scanning mirror in continuous rotation about a vertical axis of rotation. The angular position of the scanning mirror 18 may be detected by an angular position detector 30, such as an encoder. The light beam 14 generated by the light source 12 therefore scans the scanning area 20 generated by the rotational movement. In instances where there is an object in the scanning area 20 and a reflected light signal is detected by the light detector 26, the angular position of the object in the scanning area may be derived from the angular position of the scanning mirror 18, as detected by the angular position detector 30.

The time of flight of individual laser light pulses from their transmission until the reception after reflection by the object in the scanning area 20 may be determined, which allows for calculation of the distance of the object from the laser scanner 10 based on the known speed of light. This evaluation may be performed by a controller 32 which is operatively coupled to the light source 12, the light detector 26, the motor 28, and/or the angular position detector 30.

The components of the laser scanner 10 may be arranged in a housing 34 which includes a protective window 36 in the area where light enters and leaves the laser scanner. A portion of the light emitted by the light source 12 may be undesirably scattered back into the housing 34. As shown, such scattered light may include a reflective component 40 and a diffusive component 42. The reflective component 40 and/or the diffusive component 42 of the internally scattered light may be directly or indirectly incident on the receiving optics (e.g., lens 24, scanning mirror 18) of the laser scanner 10, which may undesirably hinder measurement capabilities (e.g., by detecting an object when no object is present, or by failing to detect an object when an object is present). Such issues can be particularly problematic in safety applications.

BRIEF SUMMARY

A laser scanner to detect objects in a scanning area may be summarized as including: a light source which in operation emits a light beam; a scanning mirror rotatable about an axis of rotation which reflects the light beam from the light source toward the scanning area and which reflects return light from objects in the scanning area; a collecting mirror dimensioned and positioned to receive the return light from the scanning mirror; an interference filter disposed between the collecting mirror and the scanning mirror, in operation the interference filter filters the return light from the scanning mirror and provides the filtered return light to the collecting mirror; a light detector disposed between the interference filter and the collecting mirror, in operation the light detector receives the filtered return light reflected from the collecting mirror; a protective window disposed between the scanning mirror and the scanning area which is transmissive to the light beam, at least a portion of the protective window rotationally symmetrical about the axis of rotation of the scanning mirror; and a light absorptive plate disposed horizontally inward of the protective window and vertically between the scanning mirror and the collecting mirror, the light absorptive plate comprising a central opening which provides an optical path between the scanning mirror and the collecting mirror.

The laser scanner may further include a separation baffle disposed proximate the central opening of the light absorptive plate, the separation baffle having a height which is greater than a height of the light absorptive plate.

The separation baffle may be dimensioned and positioned to block internally reflected light which would otherwise strike the interference filter at an incidence angle which is less than or equal to an acceptance angle of the interference filter.

The light absorptive plate may be dimensioned and positioned to block internally reflected light which would otherwise strike the interference filter at an incidence angle which is less than or equal to an acceptance angle of the interference filter. The light absorptive plate may include an absorptive surface which includes at least one of an absorptive paint or an absorptive fabric. An inward facing surface of the at least a portion of the protective window may be tilted relative to the axis of rotation of the scanning mirror to direct a reflective component of the light beam toward the light absorptive plate. At least a portion of the protective window may be tilted at an angle which is greater than or equal to 30 degrees and less than or equal to 45 degrees with respect to the axis of rotation of the scanning mirror. The at least a portion of the protective window may have a profile defined by at least a portion of a frustum of a cone. The at least a portion of the protective window may have a profile defined by at least a portion of a frustum of a cone having an semi-apex angle which is greater than or equal to 30 degrees and less than or equal to 45 degrees. At least a portion of the light absorptive plate and at least a portion of the interference filter may be coplanar. The light absorptive plate may be sized and positioned to restrict the angle of incidence of internally reflected light which strikes the interference filter. The light absorptive plate may have a ring-shaped profile. The at least a portion of the protective window may include an inward facing surface and an outward facing surface, and at least one of the inward facing surface and the outward facing surface may be coated with an anti-reflective coating. At least a portion of the protective window may be tilted to direct a reflective component of the light beam toward the light absorptive plate.

The laser scanner may further include: a dust detection system, comprising: a test light transmitter disposed adjacent to or on the light absorptive plate; a test light receiver disposed proximate the test light transmitter; and a reflective surface disposed outside the protective window.

The laser scanner may include a brim above the protective window which extends outward therefrom, and the reflective surface may be disposed on a downward facing surface of the brim.

A method of operating a laser scanner to detect objects in a scanning area may be summarized as including: emitting, by a light source, a light beam; reflecting, by a scanning mirror rotatable about an axis of rotation, the light beam emitted by the light source toward a protective window between the scanning mirror and the scanning area; absorbing, by a light absorptive plate disposed horizontally inward of the protective window and vertically between the scanning mirror and the collecting mirror, light which is internally reflected by the protective window; reflecting, by the scanning mirror, return light reflected from objects in the scanning area toward an interference filter; filtering, by the interference filter, the return light from the scanning mirror to provide filtered return light; reflecting, by a collecting mirror, the filtered return light toward a light detector; and detecting, by the light detector, the filtered return light reflected from the collecting mirror.

The method of operating a laser scanner to detect objects in a scanning area may further include blocking, by a separation baffle, internally reflected light which would otherwise strike the interference filter at an incidence angle which is less than or equal to an acceptance angle of the interference filter.

Absorbing light which is internally reflected by the protective window may include blocking, by the light absorptive plate, internally reflected light which would otherwise strike the interference filter at an incidence angle which is less than or equal to an acceptance angle of the interference filter.

The method of operating a laser scanner to detect objects in a scanning area may further include reducing, by an anti-reflective coating disposed on a surface of the protective window, an amount of light internally reflected by the protective window.

An optical system for a laser scanner which detects objects in a scanning area may be summarized as including: a light source which in operation emits a light beam; a scanning mirror rotatable about an axis of rotation which reflects the light beam from the light source toward the scanning area and which reflects return light from objects in the scanning area; a collecting mirror dimensioned and positioned to receive the return light from the scanning mirror; an interference filter disposed between the collecting mirror and the scanning mirror; a light detector disposed between the interference filter and the collecting mirror; a protective window disposed between the scanning mirror and the scanning area which is transmissive to the light beam; and a light absorptive system disposed horizontally inward of the protective window and vertically between the scanning mirror and the collecting mirror.

The light absorptive system may include a light absorptive plate disposed horizontally inward of the protective window and vertically between the scanning mirror and the collecting mirror. The light absorptive plate may include a central opening which provides an optical path between the scanning mirror and the collecting mirror. The light absorptive system may include a separation baffle disposed between the light absorptive plate and the interference filter.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
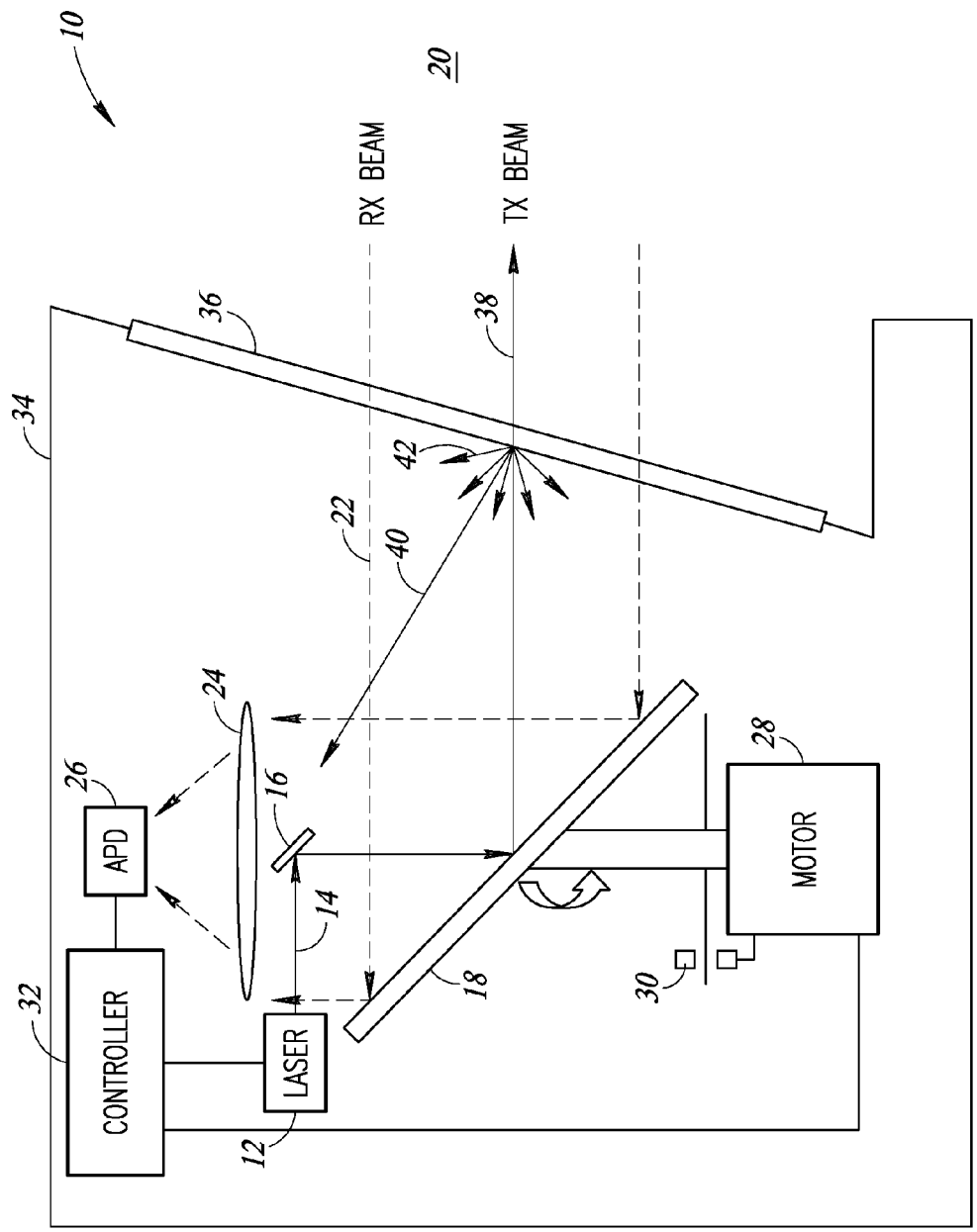
FIG. 1 is a schematic sectional view of a laser scanner.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to laser scanners and optical systems for laser scanners which may be used in any number of applications, such as safety applications. The optical system of one or more implementations may include an emitting or transmission subsystem which scans a scanning area using a laser beam. The optical system may also include a reception subsystem which detects light (visible or nonvisible, more generally "electromagnetic radiation") scattered back by an object positioned inside the scanning area. Compared to existing systems and methods, one or more of the implementations discussed herein provide relatively better performance by, among other things, reducing light reflection inside the housing of a laser scanner generated by the incidence of light from a laser beam on a protective window of the laser scanner.

In one or more implementations discussed below, at least a portion of a protective window is inclined or tilted at a determined angle with respect to a laser beam emitted from a light source. The protective window may include one or more anti-reflective coatings applied to an inner surface and/or an outer surface thereof. Such anti-reflective coatings may operate to reduce or minimize the diffusive component of internally scattered light. The protective window may be inclined or tilted to send the reflective component of internally scattered light into a zone or region of the laser scanner where an energy light absorber is present. Such zone or region may be referred to herein as a "dead zone" or "optical trap zone." In some implementations, a bulkhead system which may include a separation baffle is provided to prevent light incident on an interference filter of a receiving optical system at an angle which is below the acceptance angle of the interference filter.

Figure 2:
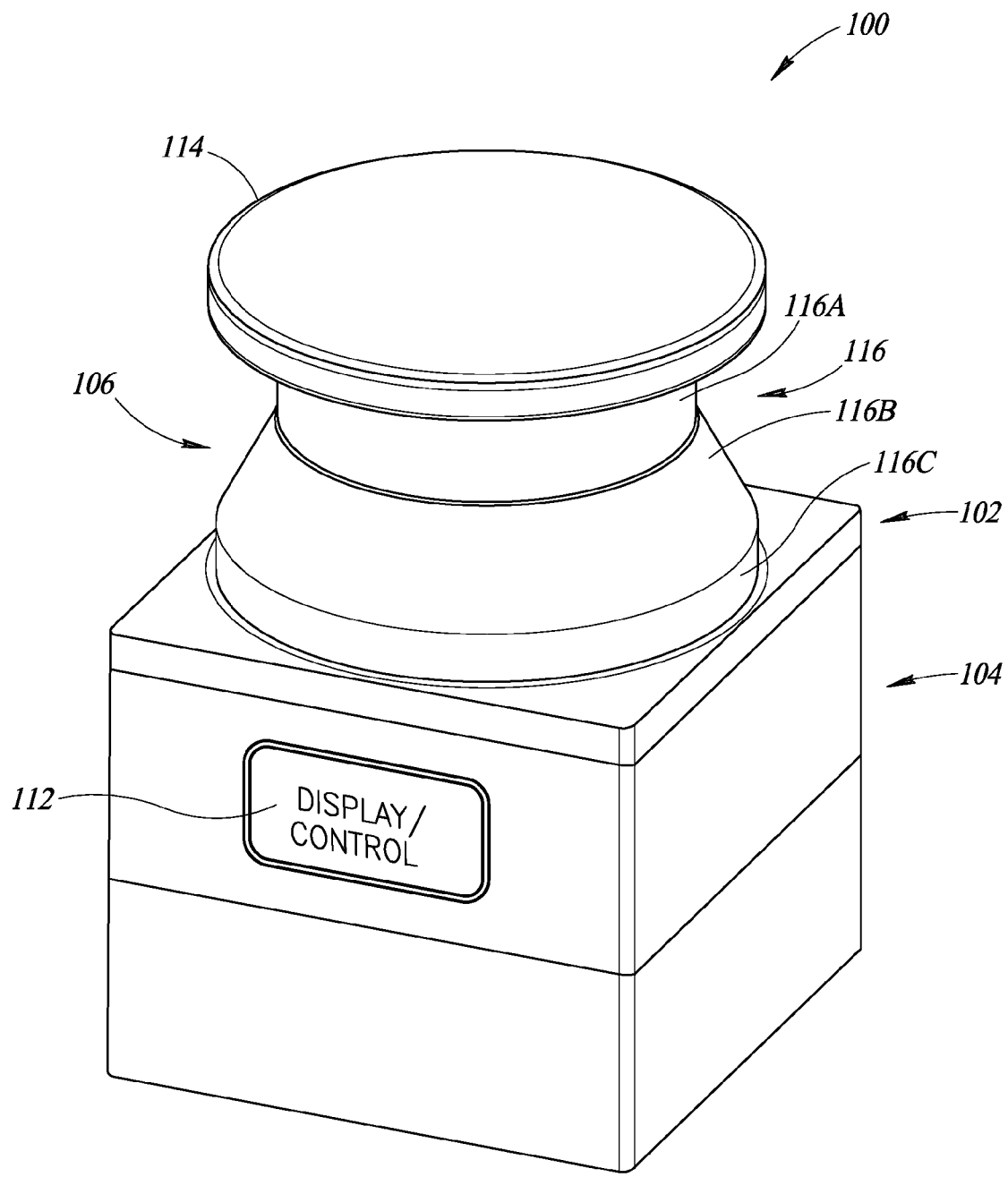
FIG. 2 is an isometric view of a laser scanner, according to one illustrated implementation.

Referring to FIG. 2, a laser scanner 100 is shown, according to one illustrated implementation. The laser scanner 100 includes a housing 102 which includes lower housing portion 104 and an upper housing portion 106. Each of the lower housing portion 104 and the upper housing portion 106 may include respective interior chambers 108 and 110 (see FIG. 5) for containing one or more components of the laser scanner 100 therein. The lower housing portion 104 may include a display/control panel 112 which provides a user interface comprising one or more inputs (e.g., button, knob, touchscreen) and one or more outputs (e.g., screen, light, audio).

The upper housing portion 106 may include circular-shaped brim 114 (also referred to as an eave or overhang) disposed over a protective window 116 which is positioned in an area where light enters and leaves the laser scanner 100. The protective window 116 may be made of a plastic material (e.g., polycarbonate, other polymer material) which has a high transmittance of light for wavelengths which are emitted by a light source 118 (FIG. 3) of the laser scanner 100. In some implementations, the visual appearance of the window 116 may be black, which filters visible light and which hides the internal components of the laser scanner 100. The window 116 may have rotation symmetry about the vertical axis of rotation 120 (FIG. 3) of the scanning mirror 128 of the laser scanner.

In some implementations, the protective window 116 has a profile which is divided into an upper section 116A, a middle section 116B, and a lower section 116C. The middle section 116B of the protective window 116 may be tilted with a relatively large angle (e.g., 30 degrees, 45 degrees) with respect to the vertical rotation axis 120. In the example shown, the upper section 116A and lower section 116C of the protective window 116 are cylindrical in shape. The middle section 116B is in the shape of a frustum of a cone ("frustoconical") which flares outward and downward between the upper section 116A and the lower section 116C. In some implementations, the middle section 116B may have a profile of a frustum of a cone having an semi-apex angle which is greater than or equal to 30 degrees and less than or equal to 45 degrees, for example.

The protective window 116 includes an inner surface 117A (FIG. 3) which faces the internal components of the laser scanner 100 and an outer surface 117B which faces a scanning area 130. At least a portion of one or both of the surfaces 117A-117B of the protective window 116 may be coated with one or more anti-reflective coatings which, as discussed above, reduces reflection of the diffusive component and/or the reflective component of internally scattered light.

The tilted shape of the middle section 116B of the protective window 116 provides at least two benefits. First, for at least some coating processes the inner surface 117A and outer surface 117B of the window 116 can be effectively coated with an anti-reflective coating only if the tilt of the window 116 is above a certain angle (e.g., 30 degrees or more). This is because the dielectric material in the vacuum deposition process comes from a direction which is parallel to the vertical symmetry axis and cannot substantially stack on vertical or nearly vertical surfaces. Second, by providing the tilted middle section 116B of the protective window 116, the small fraction of light transmitted from the light source 118 which undergoes specular reflection is directed downward away from the optical path of the receiving subsystem and can be stopped by a light absorbing material positioned within the housing 102 of the laser scanner 100, as discussed further below.

Figure 3:
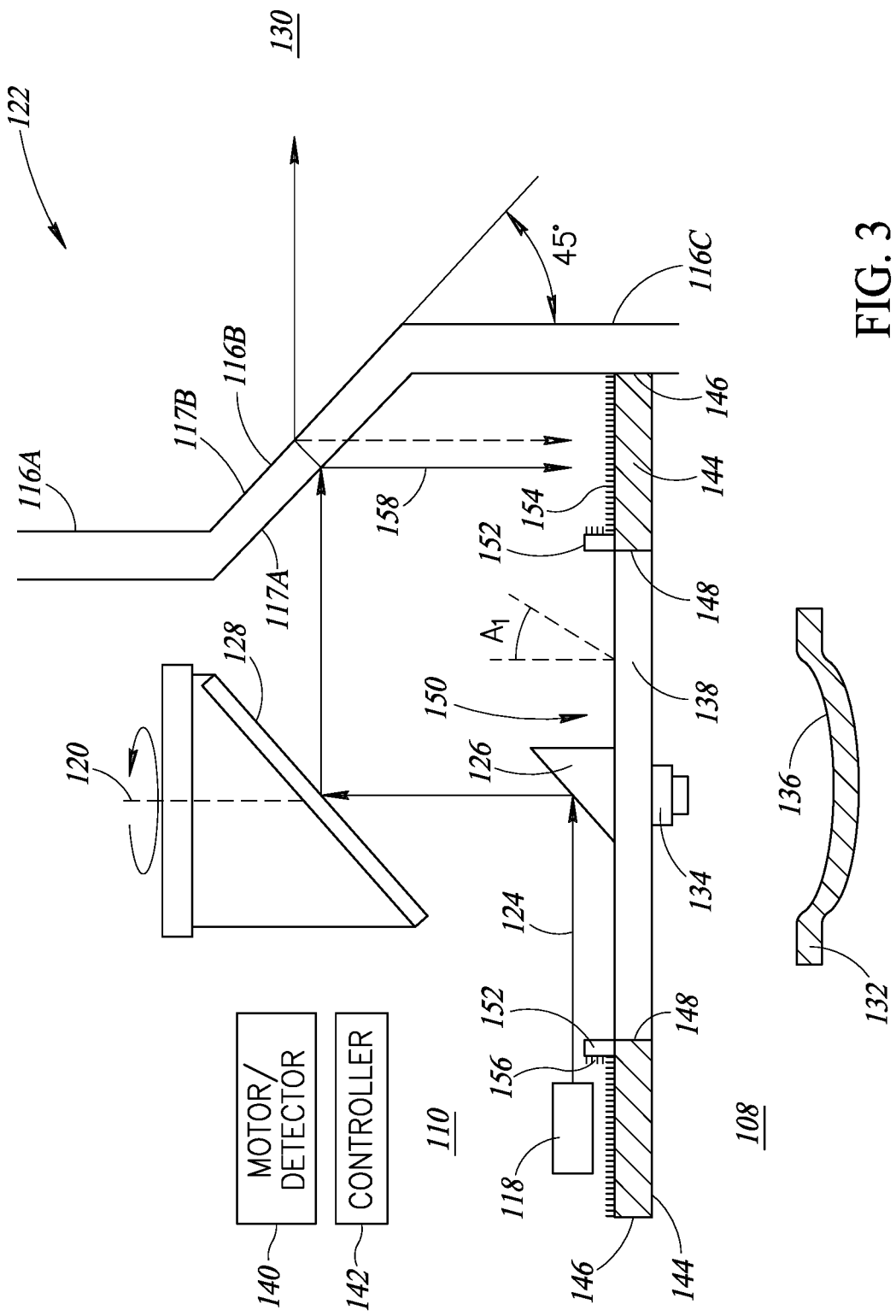
FIG. 3 is a schematic sectional view of a portion of a laser scanner which includes a protective window tilted at an angle of 45 degrees, according to one illustrated implementation.

Referring to FIG. 3, portions of a laser scanner 122 are shown, according to one illustrated implementation. The laser scanner 122 may be similar or identical to the laser scanner 100 of FIG. 2. The laser scanner 122 includes the light source or emitter 118, such as a laser diode, that emits a collimated beam 124 in the form of short (e.g., few nanoseconds) pulses toward a bending or folding mirror 126, which reflects the beam toward a scanning mirror 128. The light source 118 may have an emission band in the near infrared (NIR) range and may have a peak wavelength of 905 nanometers, for example. The scanning mirror 128 directs the beam through the middle section 116B of the protective window 116 toward a scanning area 130 which may contain one or more objects to be detected.

If an object is present in the scanning area 130, diffuse light that is back-reflected by the object is reflected by the scanning mirror 128, and directed downward toward collecting optics which include a concave collecting reflector or mirror 132. The collecting mirror 132 is positioned below the folding mirror 126 to direct and focus light from the scanning mirror 128 which has been reflected from one or more objects positioned within the scanning area 130 toward a light detector 134 (e.g., avalanche photodiode, other photodetector).

Figure 5:
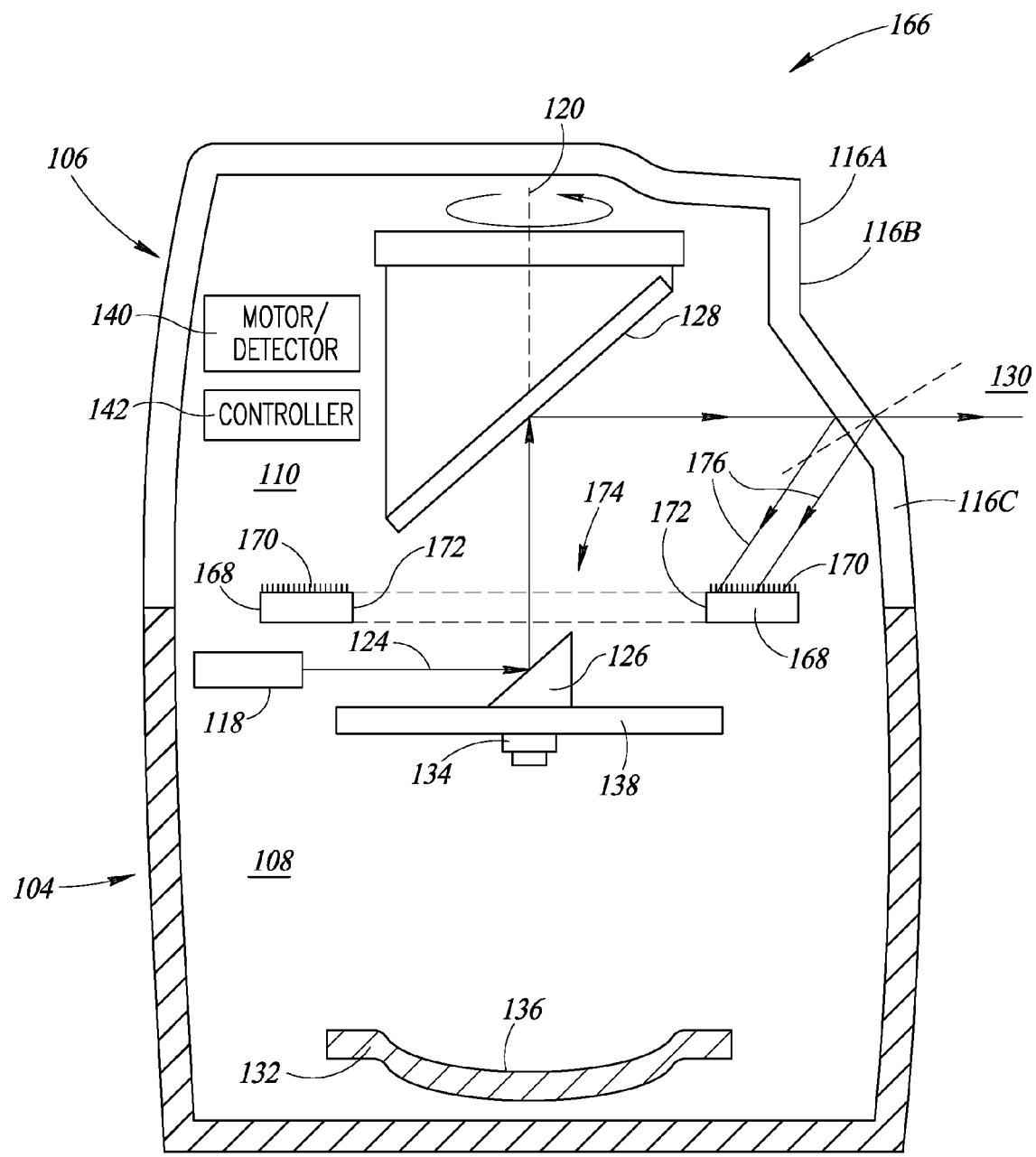
FIG. 5 is a schematic sectional view of a laser scanner which includes a circular shaped light absorber plate, according to one illustrated implementation.

The collecting mirror 132 may be formed of a plastic material (e.g., polycarbonate (PC), polymethylmethacrylate (PMMA), cyclic olefin polymer (COP)) which has a one or more layers of a reflective coating thereon to provide a reflective surface 136 (FIG. 5). The reflective coating may include one or more of an aluminum coating, a silver coating, or a gold coating, for example. The collecting mirror 132 may be formed from a material with low water absorption properties which may reduce the likelihood that a reflective coating will peel off during the lifetime of the laser scanner 122. In some implementations, the collecting mirror 132 is opaque to wavelengths of light emitted by the light source 118 so that the small fraction of light which passes through the reflective surface 136 is absorbed by the material and is not diffused inside the housing 102 of the laser scanner 122.

Figure 7:
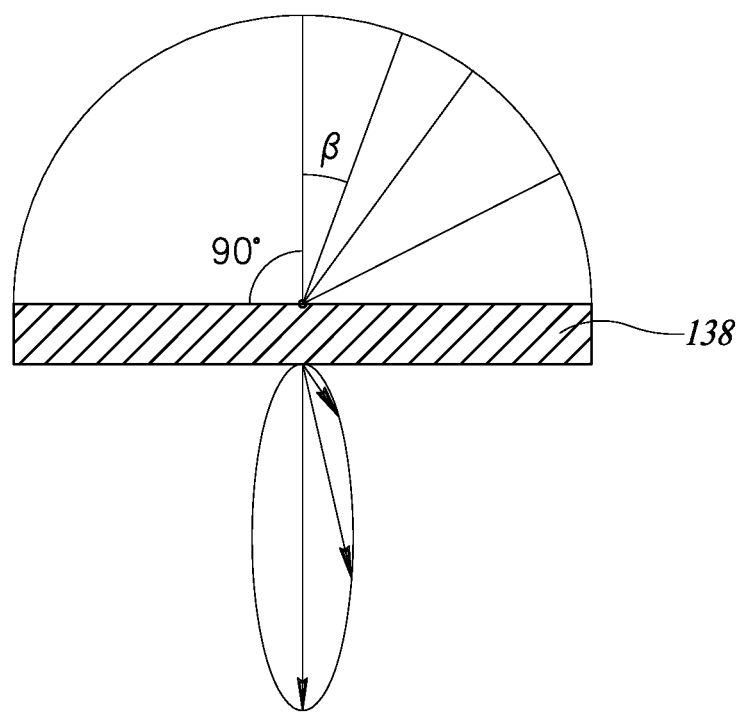
FIG. 7 is a schematic sectional view of an interference filter of a laser scanner, according to one illustrated implementation.

The laser scanner 122 also includes a dichroic or interference filter 138 positioned above (as shown) the light detector 134 and below the folding mirror 126 to filter the returned light from the scanning mirror 128 before the returned light reaches the collecting mirror 132. The interference filter 138 may be a bandpass filter which transmits spectral bands which correspond to the light emitted by the light source 118 and reflects spectral bands outside of the spectral band emitted by the light source. Since the interference filter 138 is placed in the optical path before the collecting mirror 132, the interference filter may be designed to accept rays with a relatively small incidence angle $A_1$, such as an incidence angle of only a few degrees (e.g., 3 degrees, 5 degrees, 10 degrees, 20 degrees). For example, FIG. 7 shows that as an incident angle β increases from 0 degrees, transmittance of the interference filter 138 decreases rapidly. For example, the transmittance of the interference filter 138 may be approximately 99% when β is 0 degrees, approximately 50% when β is 10 degrees, approximately 5% when β is 20 degrees, and approximately 0% when β is 25 degrees. By allowing the acceptance angle of the interference filter 138 to be relatively small, the interference filter may more effectively filter the scattered light from within the housing 122 of the laser scanner 100, thereby improving the signal to noise ratio.

In some implementations, the interference filter 138 is made with a colored glass filter substrate having a single or multilayer coating on one or both sides thereof. The glass material may be, for example, Schott RG830 glass offered by Schott Corporation or Hoya IR-83 glass offered by Hoya Corporation. The interference filter 138 may in some implementations have a black appearance because the interference filter may not be transparent to visible light but has a relatively high transmittance (e.g., greater than 90%) in the NIR region emitted by the light source 118. Additional layer(s) may be operative to filter wavelengths of light beyond the emission band of the light source 118.

The laser scanner 122 may also include a motor/detector 140 which is operatively coupled to the scanning mirror 128 to drive the scanning mirror in continuous rotation about the vertical axis 120 of rotation. For example, in some implementations the scanning mirror 128 may rotate at an approximate speed of 2000 rotations per minute. The angular position of the scanning mirror 128 may be detected by the motor/detector 140, which may include an angular position detector such as an encoder. The light beam 124 generated by the light source 118 in the form of short pulses therefore scans the scanning area 130 generated by the rotational movement. In instances where there is an object in the scanning area 130 and a reflected light signal is detected by the light detector 134, the angular position of the object in the scanning area 130 may be derived from the angular position of the scanning mirror 128, as detected by the motor/detector 140.

The time of flight of individual laser light pulses from their transmission until the reception after reflection on the object in the scanning area 130 may be determined, which allows for calculation of the distance of the object from the laser scanner 122 based on the known speed of light. This evaluation may be performed by a controller 142 which is operatively coupled to the light source 118, the light detector 134, and/or the motor/detector 140.

The controller 142 may be any suitable controller, and may include one or more central processing units (CPUs), microprocessors, digital signal processors (DSPs), application-specific integrated circuits (ASICs), field programmable gate arrays (FPGAs), programmable logic controllers (PLCs), etc. The controller 142 may include or be operatively coupled to nontransitory processor-readable storage media (e.g., RAM, ROM, flash), input/output systems, wired/wireless communication systems, etc., as is known in the art.

As shown in FIG. 3, the laser scanner 122 includes a light absorptive plate 144 disposed horizontally inward of the lower section 116A of the protective window 116 and vertically below the tilted middle section 116B of the protective window. In some implementations, the light absorptive plate 144 may be annular-shaped or ring-shaped with an outer edge 146 adjacent or proximate to the lower section 116A of the protective window 116 and an inner edge 148 adjacent or proximate to a perimeter of the interference filter 138. The inner edge 148 of the light absorptive plate 144 may define a central opening 150 which in some implementations is sized and dimensioned to receive the interference filter 138 therein. As shown, in the implementation illustrated in FIG. 1 at least a portion of the light absorptive plate 144 and at least a portion of the interference filter 138 are coplanar, forming a reflection absorbing plane which separates the acquisition chamber 108 from the emission chamber 110.

The laser scanner 122 may optionally include a separation baffle or light baffle 152 positioned at the border between the light absorptive plate 144 and the inner interference filter 138. The separation baffle 152 may also be annular in shape in some implementations. The light absorptive plate 144 and the separation baffle 152 may be independent components, or may be integrally formed as a single component. The separation baffle 152 may have a height which does not interfere with the laser beam 124 emitted from the light source 118. The separation baffle 152 may help prevent light reflected from the inner surface 117A and/or outer surface 117B of the protective window 116 from being incident upon the interference filter 138 at relatively shallow angles (e.g., less than 20 degrees). As noted above, the interference filter 138 may be operative to filter light incident upon the interference filter at relatively steep angles (e.g., greater than 20 degrees). Thus, the light absorptive plate 144, the separation baffle 152 and the interference filter 138 in combination form a reflection-absorbing plane or barrier between the emission chamber 110 and the acquisition chamber 108 and suppress all spurious scattered beams, without limiting the acquisition field of the laser scanner 122.

The light absorptive plate 144 may include an upward facing light absorptive surface 154. Similarly, the separation baffle 152 may include a light absorptive surface 156 disposed on at least an outward facing surface thereof. The light absorptive surfaces 154 and 156 may integrally formed with the light absorptive plate 144 and the separation baffle 152, respectively. Additionally or alternatively, the light absorptive surface 154 and 156 may include a coating (e.g., black paint) or a material (e.g., black felt or other fabric) placed on one or more surfaces of the light absorptive plate 144 and/or the separation baffle 152.

In the example of FIG. 3, the middle section 116B of the protective window 116 is tilted outward at an angle of 45 degrees with respect to the rotational axis 120 of the scanning mirror 128. Such configuration causes light emitted by the light source 118 which is reflected (reflected light 158) to be directed downward, parallel to the vertical axis 120 of rotation of the scanning mirror 128 and toward the light absorptive plate 144.

Figure 4:
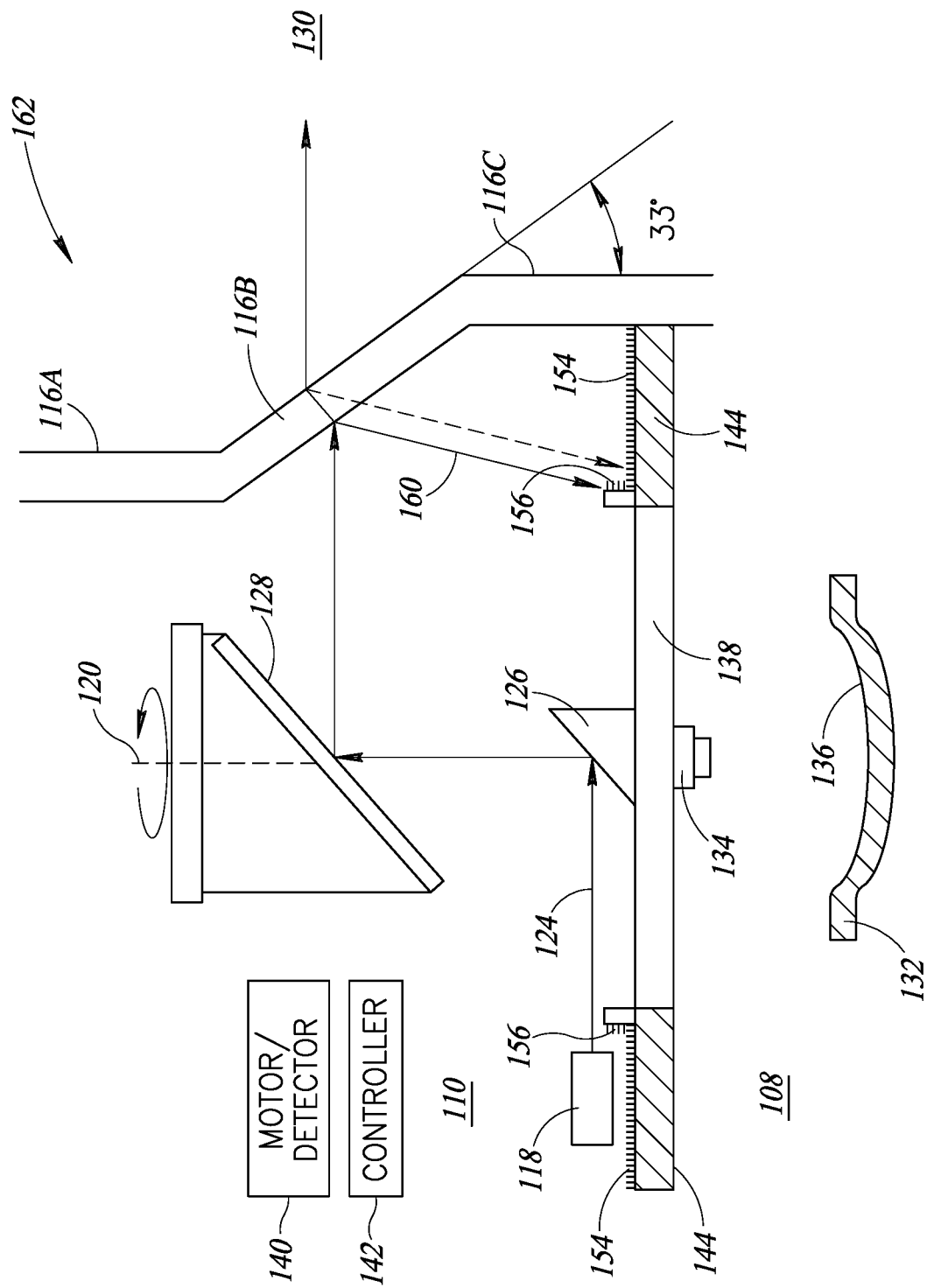
FIG. 4 is a schematic sectional view of a portion of a laser scanner which includes a protective window tilted at an angle of 33 degrees, according to one illustrated implementation.

Referring to FIG. 4, another implementation of a laser scanner 162 is shown. The laser scanner 162 is in many respects similar to the laser scanners discussed above. Thus, similar or even identical structures or elements are identified by the same reference numbers as used previously. In the interest of conciseness, only significant differences are discussed below.

Similar to the laser scanners discussed above, the laser scanner 162 includes a protective window 116 which includes the upper section 116A, the middle section 116B and the lower section 116C. In this implementation, the middle section 116B is tilted outward and downward at an angle of 33 degrees with respect to the vertical axis 120 of rotation of the scanning mirror 128. In some implementations, such angle may allow for a more compact design and/or may provide a protective window 116 which is relatively more durable, for example.

With a tilt angle of 33 degrees, reflected light 160 is still directed downward toward the light absorptive plate 144 but is also directed inward. The separation baffle 152 operates to block reflected light 160 which would otherwise be incident upon the interference filter 138 at angles which are below the acceptance angle (e.g., 10 degrees, 20 degrees) of the interference filter. That is, reflected light 160 which passes over the separation baffle 152 and is incident upon the interference filter 138 is filtered by the interference filter, due to the relatively small acceptance angle of the interference filter. Thus, the light absorptive plate 144, the separation baffle 152, and the interference filter 138 together form a reflection-absorbing plane or barrier between the emission chamber 108 and the acquisition chamber 110 which blocks scattered beams without limiting the acquisition field of the laser scanner 162.

FIG. 5 shows another implementation of a laser scanner 166. The laser scanner 166 is in many respects similar to the laser scanners discussed above. Thus, similar or even identical structures or elements are identified by the same reference numbers as used previously. In the interest of conciseness, only significant differences are discussed below.

In this implementation, the laser scanner 166 includes the protective window 116 which includes the upper section 116A, the middle section 116B and the lower section 116C. A light absorptive plate 168 having a light absorptive surface 170 is disposed inward of and below the middle section 116B of the protective window 116 and vertically above the light source 118. The light absorptive plate 168 is annular in shape and includes an inner circular-shaped edge 172 which defines a central opening 174 which provides an optical path between the scanning mirror 128 and the collecting mirror 132. The light absorptive plate 168 is sized and dimensioned to block internally reflected light 176 which would otherwise be incident upon the interference filter 138 at angles below the acceptance angle of the interference filter. Thus, as discussed above, reflected light 176 which is at relatively shallow incident angles is absorbed by the light absorptive plate 168, while reflected light 176 which is at relatively steep incident angles is filtered by the interference filter 138 which, as discussed above, has a relatively shallow acceptance angle (e.g., 10 degrees, 20 degrees).

Figure 6:
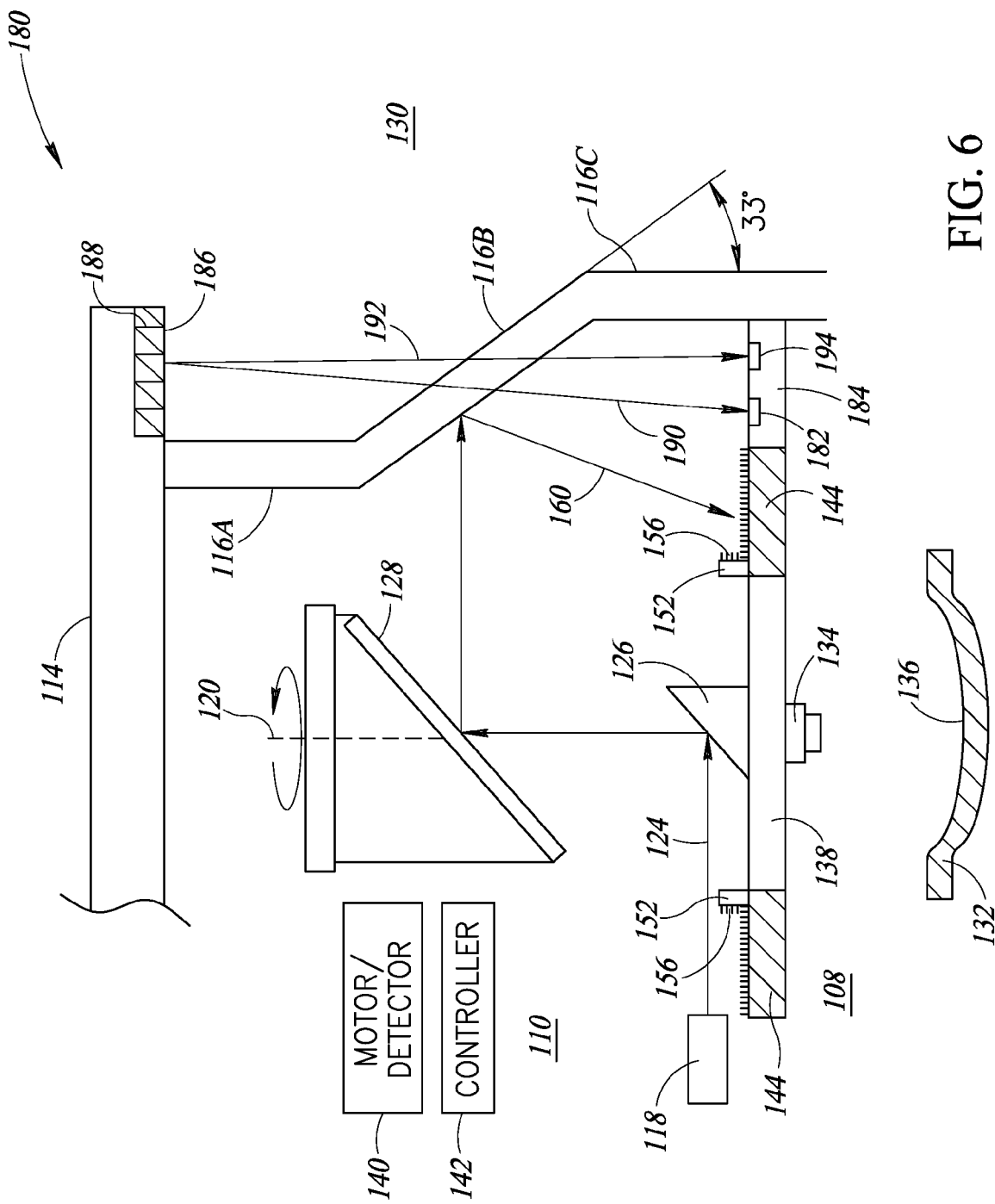
FIG. 6 is a schematic sectional view of a laser scanner which includes a dust detection subsystem, according to one illustrated implementation.

FIG. 6 shows another implementation of a laser scanner 180. The laser scanner 180 is in many respects similar to the laser scanners discussed above. Thus, similar or even identical structures or elements are identified by the same reference numbers as used previously. In the interest of conciseness, only significant differences are discussed below.

In this implementation, a test light transmitter 182 is provided on or near a light absorptive plate 184 to test the light transmissivity of the protective window 116. The light absorptive plate 184 is shown as being separate from the light absorptive plate 144 discussed above, but such is not required. For example, in some implementations, the light absorptive plate 184 and the light absorptive plate 144 may comprise a single plate, such as a single annular-shaped plate with a central opening.

A downward facing bottom surface 186 of the brim 114 (see FIG. 2) of the upper housing portion 106 of the laser scanner 180 includes a reflective surface 188 which is outside the protective window 116. The test light transmitter 182 is aligned so that a light beam 190 emitted therefrom impinges on the reflective surface 188 after passing through the middle section 116B of the protective window 116. A reflected beam 192 then passes downward through the middle section 116B of the protective window 116 to a test light receiver 194 which is spaced proximate the test light transmitter 182 on the light absorptive plate 184. Based on the signal detected by the test light receiver 194, the controller 142 (FIG. 3) may evaluate the light transmissivity of the protective window 116 and, if necessary, may output a maintenance signal, a shutdown signal, etc.

The implementations disclosed herein provide laser scanners which are compact, cost effective, and provide a clear separation between the emission subsystem (e.g., upper housing portion of the housing 122) and the receiving or reception subsystem (e.g., lower housing portion of the housing below the interference filter).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A laser scanner to detect objects in a scanning area, the laser scanner comprising:
    a light source which in operation emits a light beam;
    a scanning mirror rotatable about an axis of rotation which reflects the light beam from the light source toward the scanning area and which reflects return light from objects in the scanning area;
    a collecting mirror dimensioned and positioned to receive the return light from the scanning mirror;
    an interference filter disposed between the collecting mirror and the scanning mirror, in operation the interference filter filters the return light from the scanning mirror and provides the filtered return light to the collecting mirror;
    a light detector disposed between the interference filter and the collecting mirror, in operation the light detector receives the filtered return light reflected from the collecting mirror;
    a protective window disposed between the scanning mirror and the scanning area which is transmissive to the light beam, at least a portion of the protective window rotationally symmetrical about the axis of rotation of the scanning mirror; and
    a light absorptive plate disposed horizontally inward of the protective window and vertically between the scanning mirror and the collecting mirror, the light absorptive plate comprising a central opening which provides an optical path between the scanning mirror and the collecting mirror.

2. The laser scanner of claim 1, further comprising:
    a separation baffle disposed proximate the central opening of the light absorptive plate, the separation baffle having a height which is greater than a height of the light absorptive plate.

3. The laser scanner of claim 2 wherein the separation baffle is dimensioned and positioned to block internally reflected light which would otherwise strike the interference filter at an incidence angle which is less than or equal to an acceptance angle of the interference filter.

4. The laser scanner of claim 1 wherein the light absorptive plate is dimensioned and positioned to block internally reflected light which would otherwise strike the interference filter at an incidence angle which is less than or equal to an acceptance angle of the interference filter.

5. The laser scanner of claim 1 wherein the light absorptive plate includes an absorptive surface which includes at least one of an absorptive paint or an absorptive fabric.

6. The laser scanner of claim 1 wherein an inward facing surface of the at least a portion of the protective window is tilted relative to the axis of rotation of the scanning mirror to direct a reflective component of the light beam toward the light absorptive plate.

7. The laser scanner of claim 1 wherein at least a portion of the protective window is tilted at an angle which is greater than or equal to 30 degrees and less than or equal to 45 degrees with respect to the axis of rotation of the scanning mirror.

8. The laser scanner of claim 1 wherein the at least a portion of the protective window has a profile defined by at least a portion of a frustum of a cone.

9. The laser scanner of claim 8 wherein the at least a portion of the protective window has a profile defined by at least a portion of a frustum of a cone having an semi-apex angle which is greater than or equal to 30 degrees and less than or equal to 45 degrees.

10. The laser scanner of claim 1 wherein at least a portion of the light absorptive plate and at least a portion of the interference filter are coplanar.

11. The laser scanner of claim 1 wherein the light absorptive plate is sized and positioned to restrict the angle of incidence of internally reflected light which strikes the interference filter.

12. The laser scanner of claim 1 wherein the light absorptive plate has a ring-shaped profile.

13. The laser scanner of claim 1 wherein the at least a portion of the protective window includes an inward facing surface and an outward facing surface, and at least one of the inward facing surface and the outward facing surface is coated with an anti-reflective coating.

14. The laser scanner of claim 1 wherein at least a portion of the protective window is tilted to direct a reflective component of the light beam toward the light absorptive plate.

15. The laser scanner of claim 1, further comprising:
    a dust detection system, comprising:
        a test light transmitter disposed adjacent to or on the light absorptive plate;
        a test light receiver disposed proximate the test light transmitter; and
        a reflective surface disposed outside the protective window.

16. The laser scanner of claim 15 wherein the laser scanner comprises a brim above the protective window which extends outward therefrom, and the reflective surface is disposed on a downward facing surface of the brim.

17. A method of operating a laser scanner to detect objects in a scanning area, the method comprising:
    emitting, by a light source, a light beam;
    reflecting, by a scanning mirror rotatable about an axis of rotation, the light beam emitted by the light source toward a protective window between the scanning mirror and the scanning area;
    absorbing, by a light absorptive plate disposed horizontally inward of the protective window and vertically between the scanning mirror and the collecting mirror, light which is internally reflected by the protective window;
    reflecting, by the scanning mirror, return light reflected from objects in the scanning area toward an interference filter;
    filtering, by the interference filter, the return light from the scanning mirror to provide filtered return light;
    reflecting, by a collecting mirror, the filtered return light toward a light detector; and
    detecting, by the light detector, the filtered return light reflected from the collecting mirror.

18. The method of claim 17, further comprising:
blocking, by a separation baffle, internally reflected light which would otherwise strike the interference filter at an incidence angle which is less than or equal to an acceptance angle of the interference filter.

19. The method of claim 17 wherein absorbing light which is internally reflected by the protective window comprises blocking, by the light absorptive plate, internally reflected light which would otherwise strike the interference filter at an incidence angle which is less than or equal to an acceptance angle of the interference filter.

20. The method of claim 17, further comprising:
reducing, by an anti-reflective coating disposed on a surface of the protective window, an amount of light internally reflected by the protective window.

21. An optical system for a laser scanner which detects objects in a scanning area, the optical system comprising:
a light source which in operation emits a light beam;
a scanning mirror rotatable about an axis of rotation which reflects the light beam from the light source toward the scanning area and which reflects return light from objects in the scanning area;
a collecting mirror dimensioned and positioned to receive the return light from the scanning mirror;
an interference filter disposed between the collecting mirror and the scanning mirror;
a light detector disposed between the interference filter and the collecting mirror;
a protective window disposed between the scanning mirror and the scanning area which is transmissive to the light beam; and
a light absorptive system disposed horizontally inward of the protective window and vertically between the scanning mirror and the collecting mirror.

22. The optical system of claim 21 wherein the light absorptive system comprises a light absorptive plate disposed horizontally inward of the protective window and vertically between the scanning mirror and the collecting mirror.

23. The optical system of claim 22 wherein the light absorptive plate comprises a central opening which provides an optical path between the scanning mirror and the collecting mirror.

24. The optical system of claim 23 wherein the light absorptive system comprises a separation baffle disposed between the light absorptive plate and the interference filter.

* * * * *